(12) United States Patent
Meldolesi et al.

(10) Patent No.: US 11,953,101 B2
(45) Date of Patent: Apr. 9, 2024

(54) FAST ACTING SHUTTLE SPOOL VALVE

(71) Applicant: Southwest Research Institute, San Antonio, TX (US)

(72) Inventors: Riccardo Meldolesi, Hove (GB); Anthony Perkins, West Sussex (GB); Clive Lacy, West Sussex (GB); Dustin Kramer, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 233 days.

(21) Appl. No.: 17/405,681

(22) Filed: Aug. 18, 2021

(65) Prior Publication Data

US 2023/0054596 A1 Feb. 23, 2023

(51) Int. Cl.
| | |
|---|---|
| *F16K 11/07* | (2006.01) |
| *F15B 15/22* | (2006.01) |
| *F15B 21/14* | (2006.01) |
| *F16K 3/24* | (2006.01) |

(52) U.S. Cl.
CPC ............ *F16K 11/07* (2013.01); *F15B 15/223* (2013.01); *F15B 21/14* (2013.01); *F16K 3/24* (2013.01); *F15B 2211/7052* (2013.01); *F15B 2211/755* (2013.01)

(58) Field of Classification Search
CPC ........ F16K 11/07; F16K 11/0708; F16K 3/32; F16K 3/24; F15B 15/223; F15B 21/14
See application file for complete search history.

(56) References Cited

U.S. PATENT DOCUMENTS

| | | | | |
|---|---|---|---|---|
| 3,834,172 | A * | 9/1974 | Dehne | F25B 9/14 62/6 |
| 4,509,957 | A * | 4/1985 | Firey | C10J 3/30 166/305.1 |
| 2019/0195381 | A1* | 6/2019 | Jaskiewicz | F15B 13/0435 |
| 2020/0063876 | A1* | 2/2020 | DeSalvo | G06F 3/0346 |
| 2022/0373056 | A1* | 11/2022 | Mathews | F16F 9/0227 |

\* cited by examiner

*Primary Examiner* — Kelsey E Cary
(74) *Attorney, Agent, or Firm* — Livingston Law Firm

(57) ABSTRACT

A spool valve for controlling the flow of a fluid into a reciprocating piston cylinder. A spool is slideably inserted into an outer casing, the spool valve having a first and a second non-waisted end portions and having a waisted middle portion. The casing has an intake port and output port for fluids entering and exiting the casing. A first non-waisted end portion covers the intake port during a first valve-closed event as the spool slides in one direction within the casing. The waisted middle portion is sufficiently wide to uncover both the intake port and the output port during a valve-open event as the spool slides in one direction within the casing. A second non-waisted end portion covers the output port during a second valve-closed event as the spool slides in the same one direction within the casing.

8 Claims, 10 Drawing Sheets

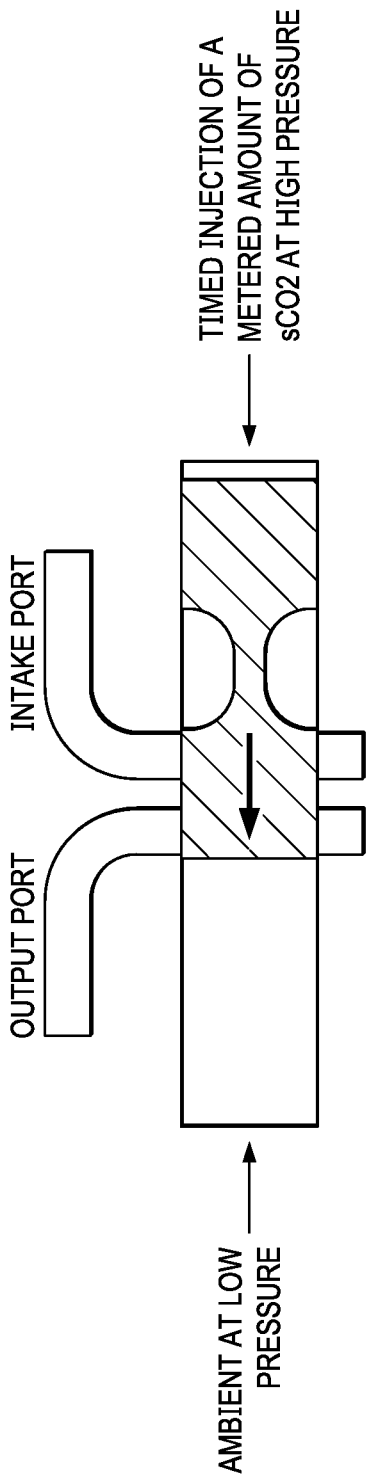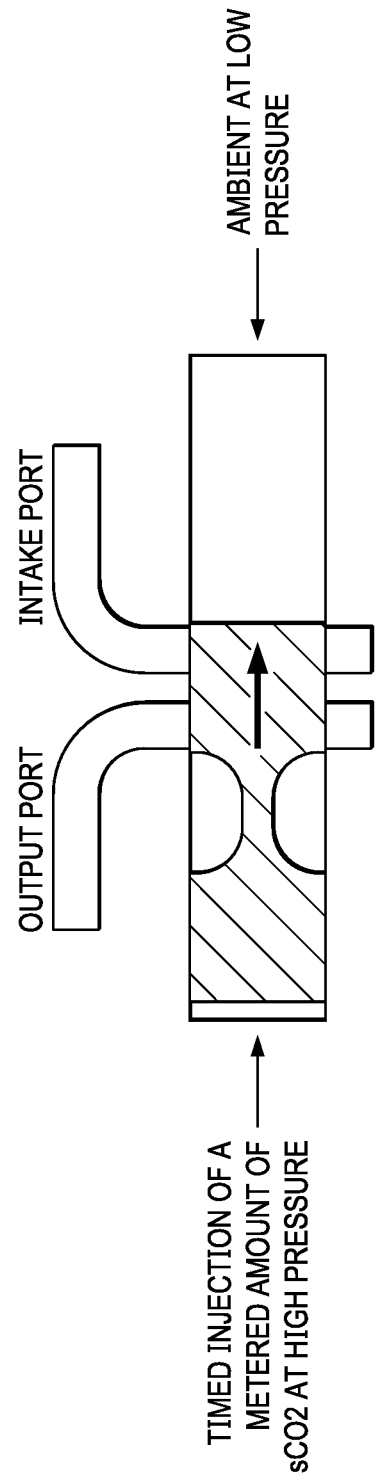

FAST ACTING SHUTTLE SPOOL VALVE

TECHNICAL FIELD OF THE INVENTION

This invention relates to valves for reciprocating piston machines, and more particularly to a spool valve for such machines.

BACKGROUND OF THE INVENTION

Spool valves are a type of valve used to control the flow direction of a fluid by combining or switching the paths through which the fluid can travel. Spool valves are used in many industries and can be used in both hydraulics (where oil is the fluid being valved) or pneumatics (where the air is the fluid being valved).

Two main categories of spool valves are rotary and sliding. A rotary spool valve consists of a tubular casing, within which is a rotating x-shaped spool. This valve functions much like a revolving door, with each section of the spool functioning as a portal for fluid to enter and exit the valve. A sliding spool valve is a spool valve in which a spool slides in and out of position within the casing, alternately blocking and opening fluid intake and outtake portals.

More specifically, a sliding spool valve is a specially configured cylinder (a "spool") inside a sealed outer casing. Ports are drilled through the casing to allow the entry or exit of fluid. The spool moves back and forth within the casing, and as it moves it either blocks or opens the ports. Port blocking is provided by lands or full diameter sections on the spool, separated by waisted sections which provide port interconnections through the casing.

Various mechanisms can be used to actuate a sliding spool valve so that the spool shifts in position. Examples of typical spool valve actuators are lever or solenoid actuators.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 9 and 10 schematically illustrate gas actuation of the spool valve.

DETAILED DESCRIPTION OF THE INVENTION

The following description is directed to a sliding spool valve and method of operating the valve. The spool valve controls the passage of fluid between two ports. Two spool end positions are used in operation of the valve. The spool shuttles between one end position (closed), to a central position (open), and to the other end position (closed). Because the spool valve slides back and forth and is operable in both directions, it may be appropriately called a "shuttle" spool valve.

For purposes of example, the spool valve is described in terms of controlling fluid into a reciprocating piston cylinder, such as are commonly used for various engines and other machinery. It is assumed that the operation of the engine or other machine can be described in terms of "operating cycles". The engine receives fluid via an intake port and the valve controls the flow of fluid into the cylinder at an appropriate time during the engine's operating cycle.

Figure 1:
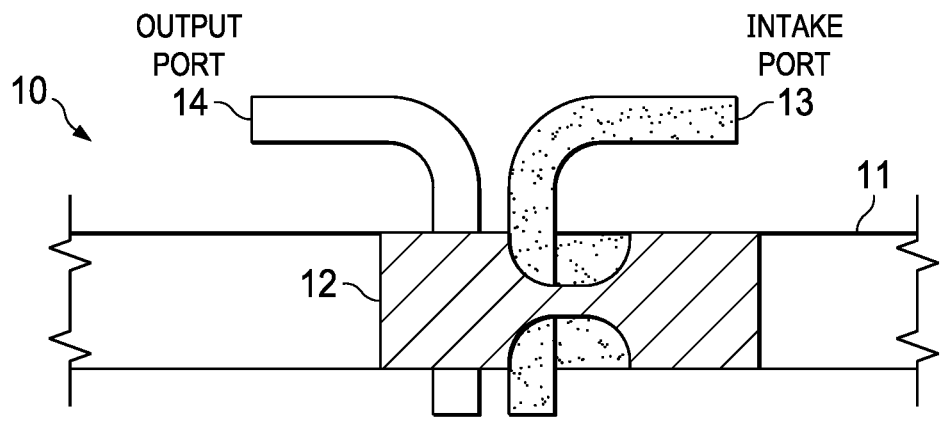
FIGS. 1-3 schematically illustrate the spool valve and its operation.
Figure 2:
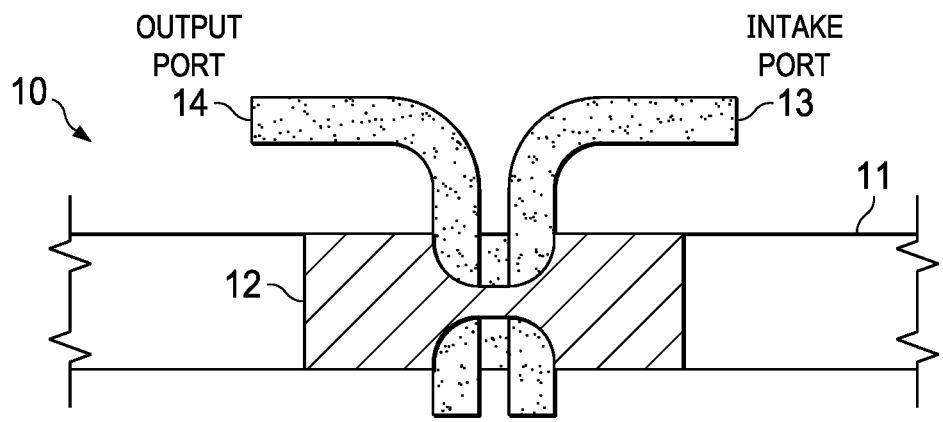
Figure 3:
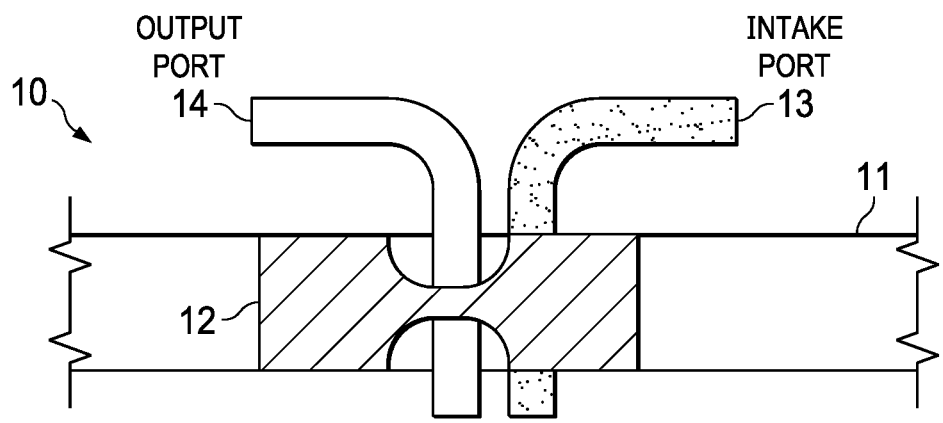

FIGS. 1-3 schematically illustrate the spool valve and its operation. The spool valve comprises an outer casing 11 and a spool 12 within the casing. The spool 12 translates back and forth within the casing 11.

Two ports, an intake port 13 and an output port 14, are bored through casing 11 and configured as annular grooves within casing 11. As explained below, the position of spool 12 determines whether fluid from the intake port 13 shall pass to the output port 14.

Spool 12 has a waisted middle portion, with "waisted" meaning that the diameter of spool 12 is smaller than the inner diameter of casing 11. The two end (non waisted) portions of spool 12 have a sealed fit to the inner diameter of casing 11. Thus, any fluid that enters the waisted portion is either contained within the waisted portion (FIG. 1, valve closed) or allowed to exit the waisted portion (FIG. 2, valve open).

In FIG. 1, spool 12 is in a first closed position within casing 11. The intake port 13 is in fluid communication with the waisted portion of spool 12. However, the output port 14 is covered by a non waisted portion, and thus fluid from intake port 13 has no access to output port 14.

In FIG. 2, spool 12 has translated to the left and is in its open position. The width of the waisted portion and the distance between the intake port 13 and output port 14 are such that fluid flows from the intake port 13 into the waisted portion and out the output port 14.

In FIG. 3, spool 12 has translated further to the left and is in a second closed position. The output port 14 is in fluid communication with waisted portion. However, the intake port 13 is covered by a non waisted portion, and thus fluid exiting the output port 14 has no access to the intake port 13.

The two spool end positions are both closed positions, with both closed positions being used in the operation of the valve. The spool 12 shuttles between one end position (closed), to a central position (open) and back to the second end position (closed).

The waisted portion of spool 12 need only be wide enough to uncover both ports during the valve-open event. The distance between ports 13 and 14 affect time required for spool valve 10 to open and then close again; a short distance and a small waisted portion will allow valve-open events of very short duration.

A feature of spool valve 10 is that spool 12 travels from its first closed position to its second closed position to open and close the ports during a single event of an operating cycle. During the next cycle, spool 12 moves from the second closed position back to the first closed position for the opening event of that next cycle. The direction of motion of the spool 12 is never reversed within a single cycle.

Thus, although spool 12 travels a longer distance than strictly necessary to change the state of the valve from fully closed to fully open and then to fully closed again, it travels only in one direction during a single cycle. It does not go back and forth within a cycle.

Figure 4:
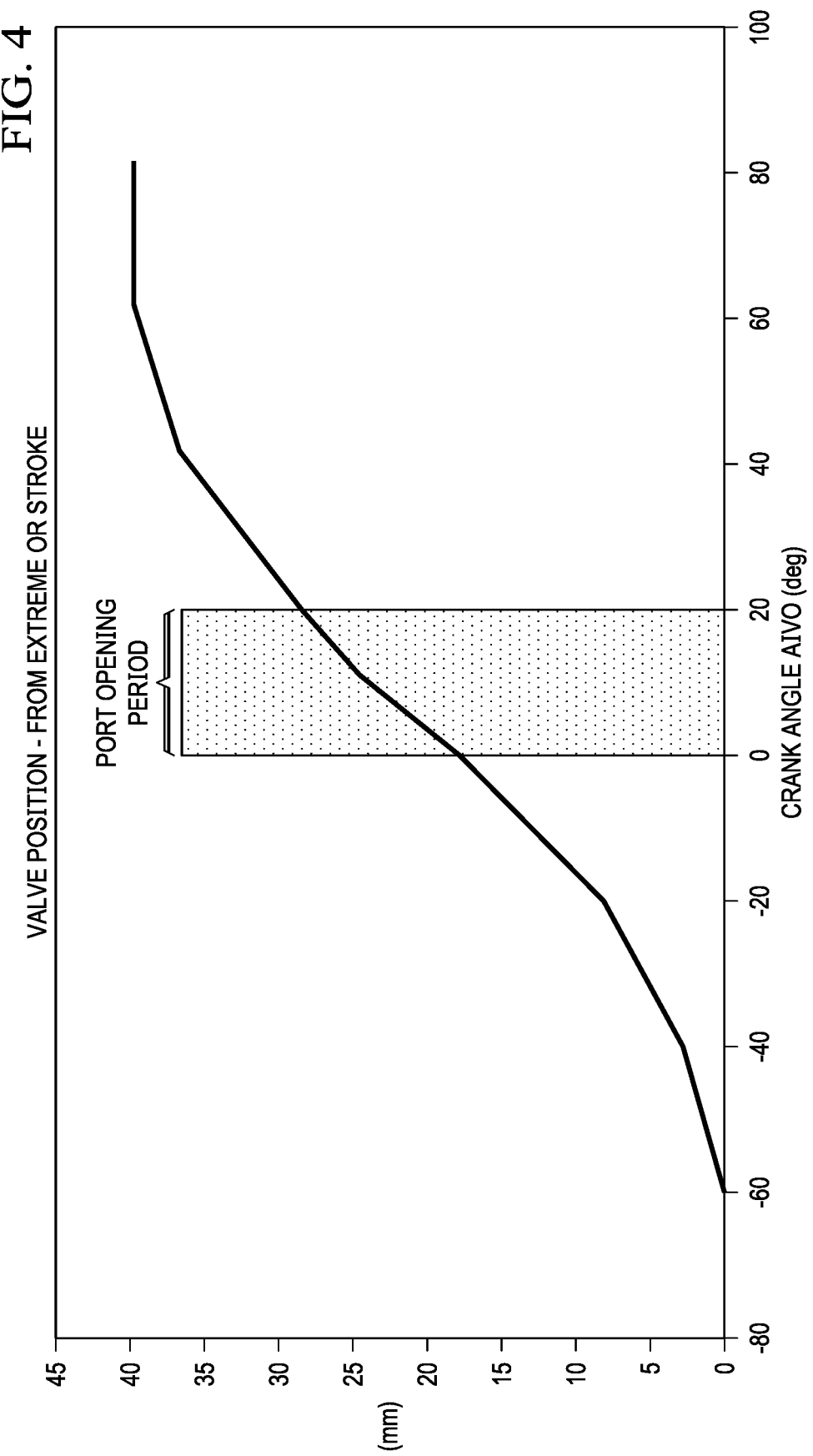
FIG. 4 illustrates a typical motion of the spool, here for an engine having a crankshaft and whose cycles may be represented in terms of crank angle degrees.

FIG. 4 illustrates a typical motion of the spool 12, here for an engine having a crankshaft and whose cycles may be represented in terms of crank angle degrees. The spool motion is represented in millimeters (mm). Assuming that the engine crankshaft rotates at constant angular velocity, an angular rotation corresponds to a time interval, AIVO (after intake valve opening).

Spool 12 accelerates from standstill, reaches a maximum velocity period, during which quickly it goes through the range of positions where the ports are open, and finally decelerates to reach a resting position at the opposite end of its stroke. The next valve opening event will be done by the spool 12 going through a stroke in the opposite direction.

Figure 5:
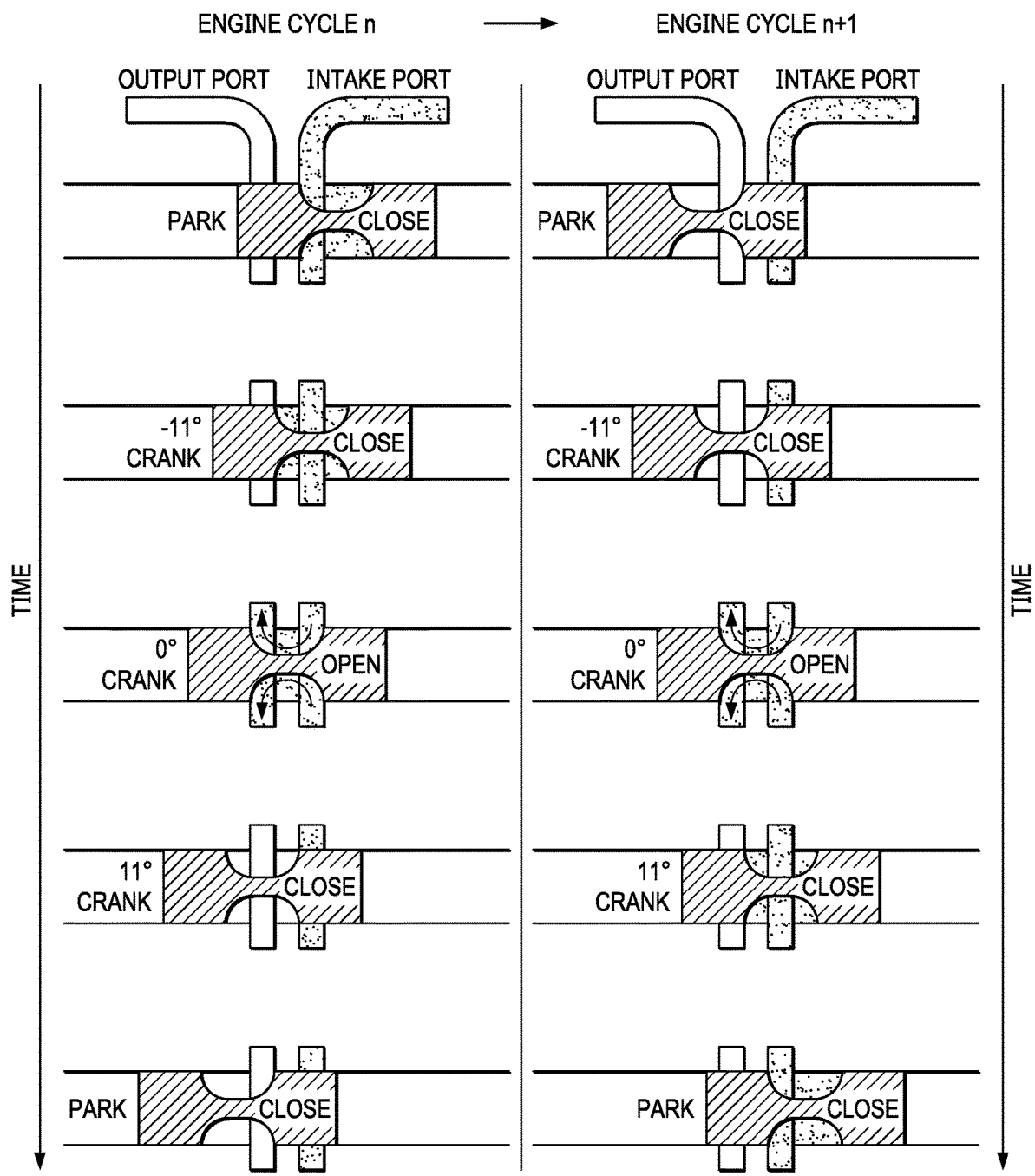
FIG. 5 illustrates the full operating sequence of the spool valve for two consecutive cycles.
Figure 6:
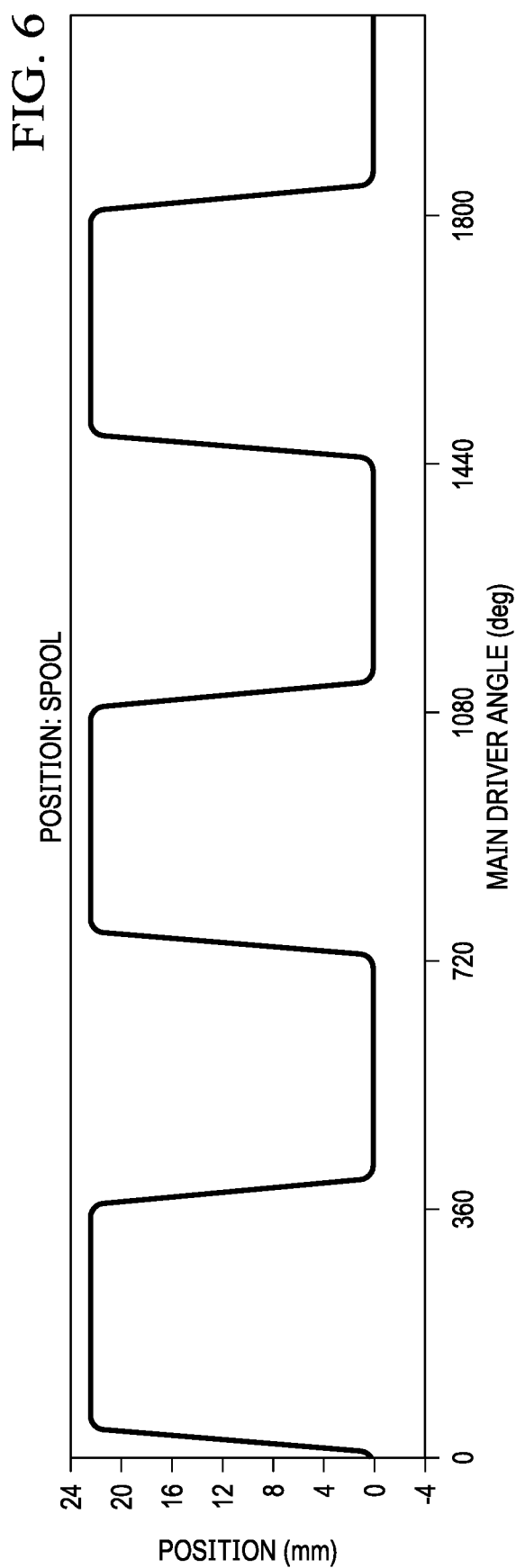
FIG. 6 illustrates how the pattern of FIG. 5 repeats for pairs of consecutive cycles.

FIG. 5 illustrates the full operating sequence of spool valve 11 for a pair of consecutive cycles, cycle n and cycle n+1. As illustrated in FIG. 6, this pattern repeats for pairs of consecutive cycles.

For a given port arrangement, spool valve 10 undergoes a stroke necessary to open and close the ports. The duration in time of the valve opening can be adjusted by changing the speed of spool 12. The start of opening of the port is controlled by the start of travel of the spool 12.

Actuation Alternatives

The long stroke and increased travel time of spool 12 enable the use of various mechanical devices for its actuation. Examples of suitable actuators are cams, crankshafts, or other mechanical linkages or mechanisms.

Figure 7:
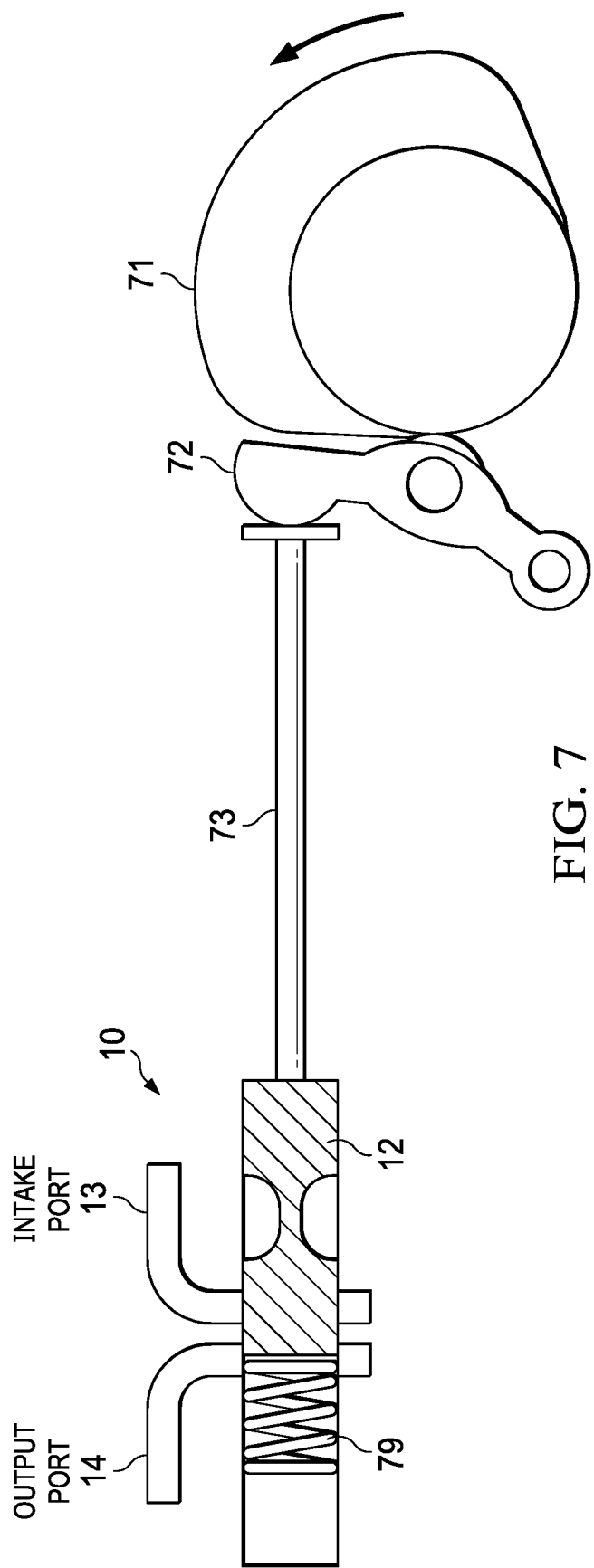
FIG. 7 illustrates actuation of the spool valve using a cam mechanism.

FIG. 7 illustrates actuation of spool valve 10 using a cam mechanism. A rotating cam 71 actuates a lever 72 attached to a rod 73, which is connected to one end of the spool 12. A spring 79 applies a rightward force to the spool 12 to maintain all the components in contact with each other during their motion. Spring 79 may be either a solid spring (typically a metal coil spring) or a gas spring.

Figure 8:
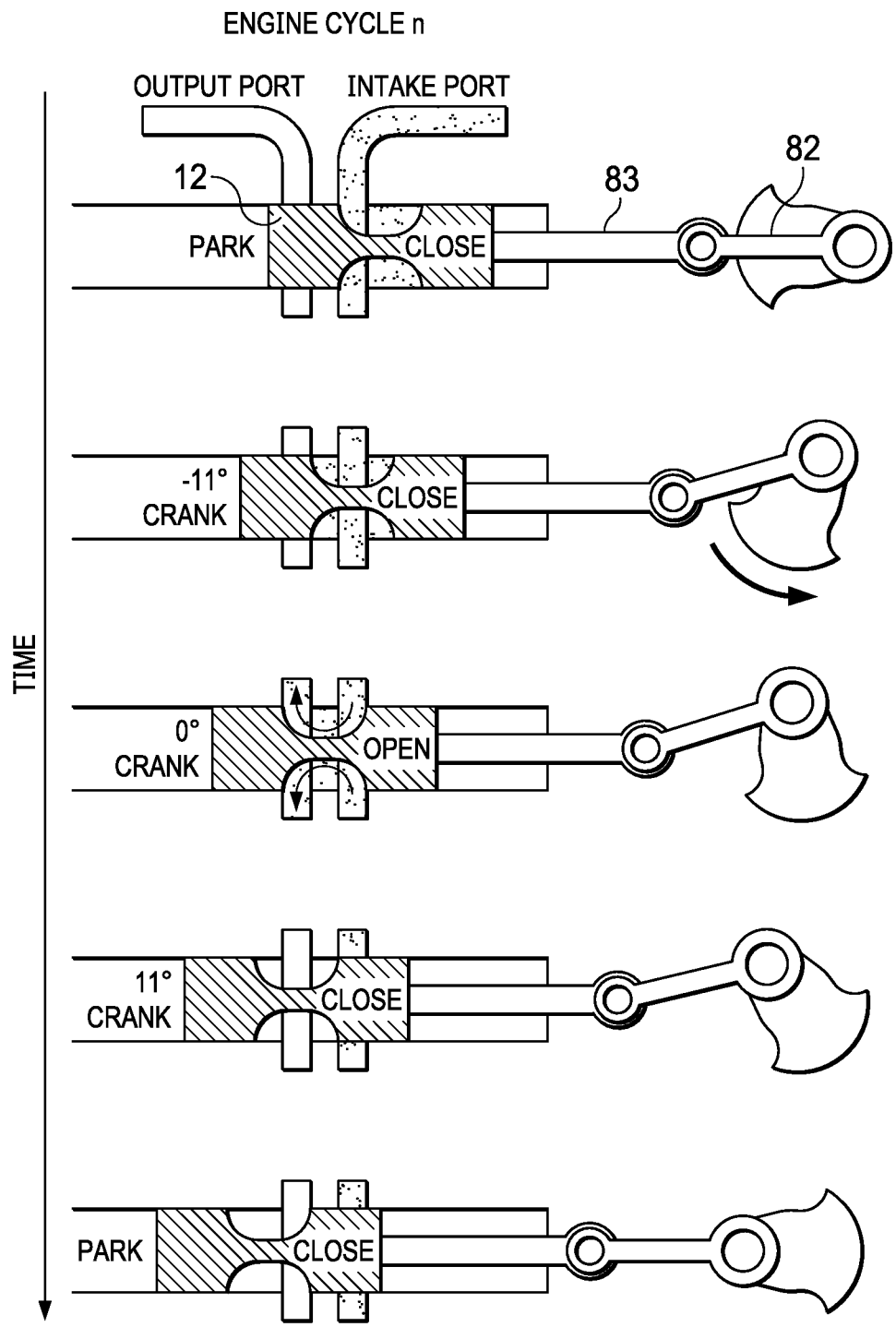
FIG. 8 illustrates actuation of the spool valve 10 using a crank mechanism.

FIG. 8 illustrates actuation of spool valve 10 using a crank mechanism. A rotating crank 82 is attached to a rod 83, which is attached to an end of spool 12. As crank 82 is rotated, the spool 12 is pushed back and forth.

In general, cam actuation can impart more aggressive accelerations than crank actuation of the same packaging size. However, crank mechanisms are generally capable of larger forces.

Gas Actuation

A particularly suitable application of spool valve 10 is for a piston expander in a supercritical carbon dioxide (sCO2) waste heat recovery system. For such expanders, a very short intake valve opening duration (about an order of magnitude less than valve opening durations of conventional engine intake and exhaust valves expressed n crank angle degrees) is necessary to meet efficiency targets.

As a representative example of the relevant time periods, the maximum frequency of operation of the expander is 30 cycles per second. Therefore, a single cycle completes in about 33 milliseconds (ms). In the example system the energy released by gas expansion is collected by a rotating shaft, so that a full cycle is completed in a single revolution (360 degrees). For best efficiency, the intake valves, which meter the flow of operating fluid into the expander, need to open for only a portion of this time. An example of a valve open duration is about 2 ms (~22 degrees shaft rotation).

This very short opening period poses a significant challenge to the operation and control of the intake valves. The valve must move, in a controlled manner, from a resting closed position to fully open and back to a closed position in a very short amount of time. The portion of its stroke where the input and output ports are connected is about 22 crank angle degrees. This makes actuation extremely challenging, because of inertia forces on all the moving components. Mechanical springs, where energy is stored as strain of the material (typically steel), are unable to react to the accelerations needed to complete a valve opening event in the necessary time.

For sCO2 applications, of further significance is that pressures and temperatures inherent to the operation of CO2 in its supercritical gaseous state are quite high. The pressure and temperature at the critical point of CO2 are 31.0° C. and 73.8 bar. Typical operating points in sCO2 thermodynamic cycles exhibit high values of temperatures and pressures in the region of 300-600° C. and 250-300 bar.

An alternative method for the actuation of spool valve 10 is to make use of the sCO2 fluid itself, taking advantage of the high and low pressure states the fluid cycles through when the machine is in operation. By taking advantage of the pressure differences it is possible to push the spool 12 to move back and forth and open and close the ports.

An advantage of this type of actuation is that it has the potential of being completely contained in the sCO2 environment, eliminating the need for seals on moving components, to separate the sCO2 environment from the atmosphere.

FIGS. 9 and 10 schematically illustrate spool valve 10 used for an sCO2 piston expander intake valve. Although gas actuation with sCO2 gas is described herein for purposes of example, the same concepts could be used for spool valves that control the flow of other gases. Furthermore, in the sCO2 example, the gas actuation is with the same gas as the working fluid being controlled, but this need not be necessarily the case.

For a certain engine cycle (n), a small amount of high pressure sCO2 is injected into a small chamber at the right end of the spool 12. Therefore, since the pressure acting on the right end of the spool is larger than the pressure acting on the left, and the areas are identical, a net force is created which pushes the spool 12 to move to the left. As the spool moves, the gas on the right chamber expands and its pressure drops. At the next engine cycle (n+1), the motion is reversed by venting the right chamber to the low pressure, sealing the left chamber from the low pressure, and injecting high pressure sCO2 into it.

Figure 11:
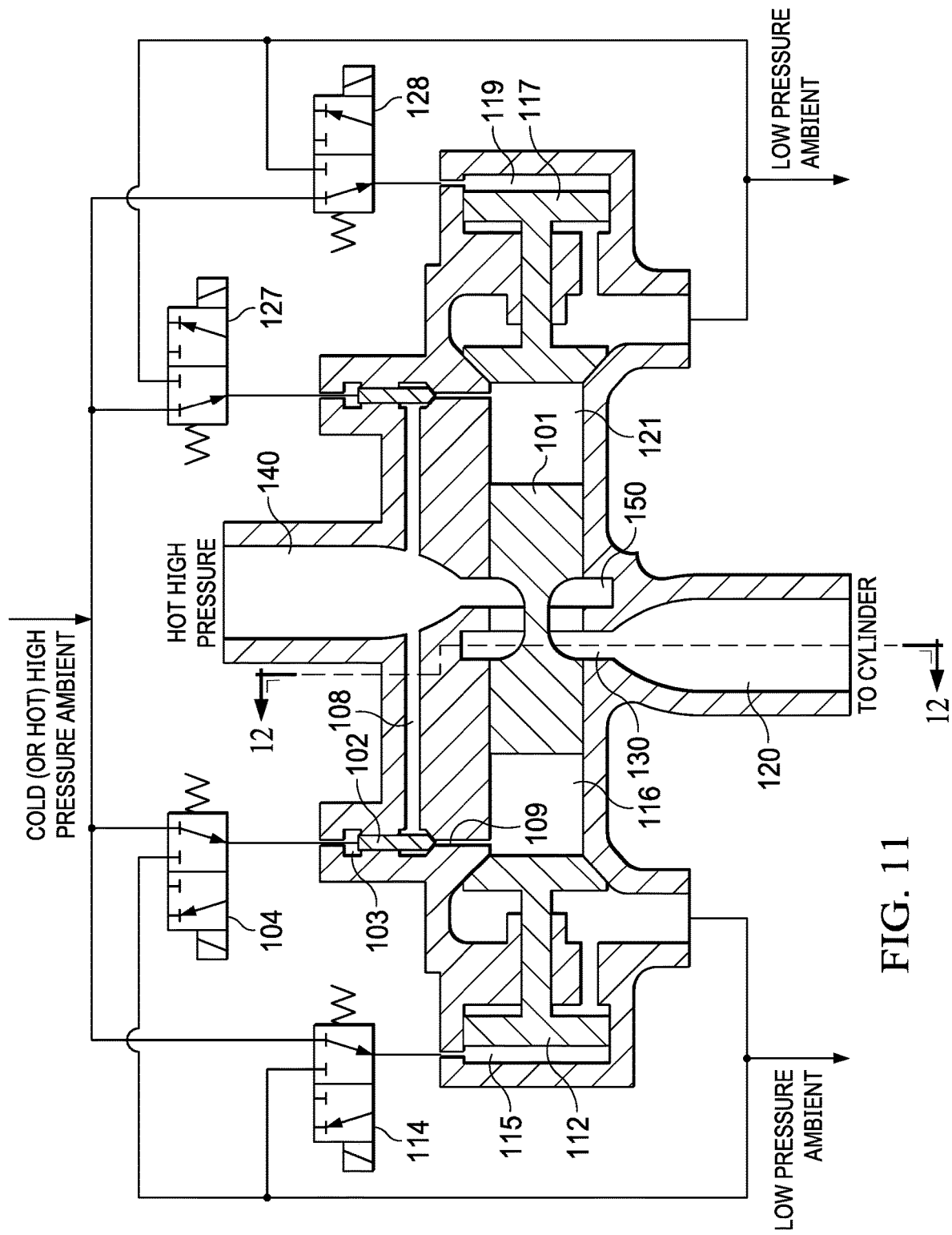
FIGS. 11 and 12 illustrate a gas-actuated spool valve for use with an sCO2 (supercritical carbon dioxide) piston expander.
Figure 12:
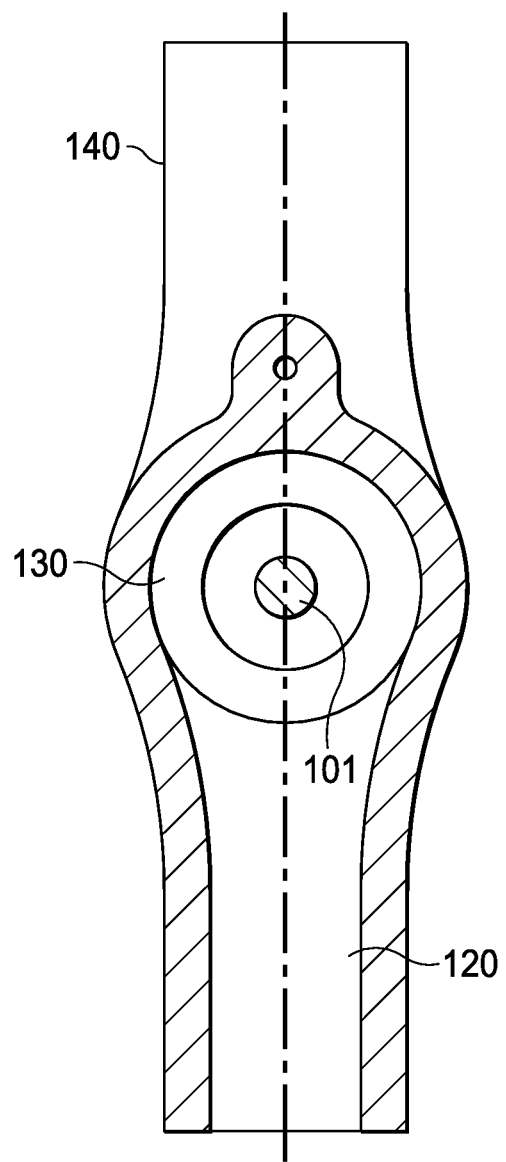

FIGS. 11 and 12 illustrate a gas-actuated spool valve for use with an sCO2 piston expander. FIG. 12 in particular illustrates how the intake and output ports are configured as annular grooves within the spool valve casing. This configuration may also be used for intake valves of other piston machines where a gas is the working fluid.

The sequence of operation for opening and closing the spool valve by moving it from left to right is as follows.

In a starting condition, spool 101 is at rest in its leftmost position (ports closed). A conical valve 102 is held closed by chamber 103 being connected to high pressure by valve 104. As a result, passages 108 and 109 are isolated from each other and chamber 116 is isolated for the high pressure. That passage could be designed to be connected either to a cold or hot high pressure source. A low-pressure poppet valve 112 is closed (in its rightmost position), because valve 114 connects chamber 115 to high pressure. On the right side of the spool valve, the low pressure right poppet valve 117 is open (in its rightmost position), or allowed to open, because valve 128 connects chamber 119 to low pressure.

For rightwards motion of the spool 101, valve 104 connects chamber 103 to low pressure for a set period of time, allowing the high pressure acting to the lower side of conical valve 102 to lift, and a controlled amount of high pressure fluid to flow through passages 108 and 109 into chamber 116. This raises the pressure in chamber 116 to a chosen initial value, (ranging between the cycle high pressure and the cycle low pressure). The low pressure left poppet valve is held shut by the three-way valve 114 connecting chamber 115 to high pressure.

The fluid in chamber 116 pushes on the left end of the spool, starting to move it towards the right. The pressure in chamber 116 starts to drop as a result of the increasing volume of chamber 116. At the same time, the motion of the spool towards the right causes the volume of chamber 121 to decrease, and the fluid in chamber 121 is pushed into the low pressure environment through the open valve 117.

As spool 101 continues to move to the right, it uncovers the ports 130 and 150, connecting pipes 120 and 140 together, therefore allowing the high pressure hot fluid to flow into the cylinder of the expander (not shown). Given the width of the ports 130 and 150 and the geometry of spool 101, the period of time pipes 120 and 140 are connected depends on the average velocity of the spool 101 during that period. The velocity in turn is controlled by the initial value of the pressure in chamber 116, controlled by valve 104.

This variability of connection time for pipes 120 and 140 allows improved control of the operation of the expander, allowing control of the mechanical power output of the expander, improved efficiency (power output divided by mass of high pressure fluid used), or both.

Towards the end of its motion to the right, the spool 101 is decelerated by a spring being compressed (not shown) or by the timed closure of valve 117 by the pressure in chamber 119 being raised by valve 128 connecting it to the high-pressure environment. This timed closure allows creating a cushion of fluid in chamber 121, now sealed, and brings the spool to a controlled stop.

Leftwards motion of the spool 101 mirrors rightward motion of the spool.

For the gas-actuator to be sealed within the sCO2 environment, the solenoid valves 104, 114, 127, and 128, must enclose internal passages and moving components into the sCO2 environment. The solenoid can be in the atmosphere and move the internal valve parts through a non-magnetic sheath, as commonly done in sealed valves.

The above-described gas-actuated spool valve has a single pair of ports 130 and 150, connecting pipes 120 and 140. This embodiment minimizes the spool mass, therefore allowing shorter connection time periods between pipes 120 and 140. If larger flow rates are required, multiple valves (single port pairs) may be connected in parallel.

Spool Valve with Multiple Ports

Figure 13:
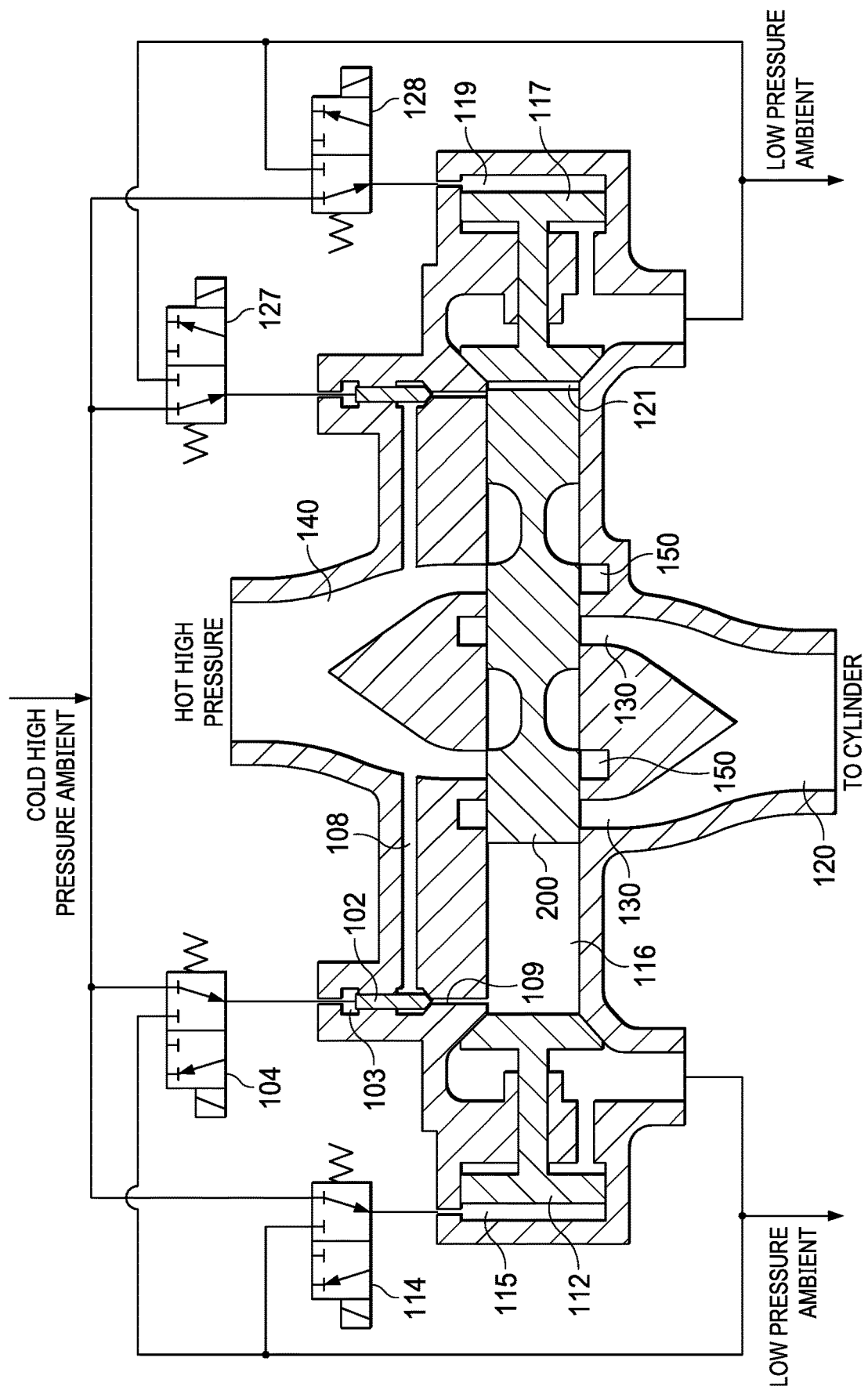
FIG. 13 illustrates a spool valve having multiple ports.

FIG. 13 illustrates a spool valve 200 having multiple ports. For purposes of illustration, spool valve 200 is shown with the gas actuated configuration of FIGS. 11 and 12. However, a multi-port spool valve could also be used with the cam and crank actuators described above, or with other actuators.

For multiple ports, there is a penalty in terms of spool mass increase compared with single port pair embodiments. However, the increased flow area allows using a single valve rather than two, therefore reducing the total number of components (i.e. four solenoid valves rather than eight, two conical valves rather than four, two low pressure poppet valves rather than four, one valve body rather than two).

What is claimed is:

1. A spool valve for controlling the flow of a fluid into a reciprocating piston cylinder, comprising:
   an outer casing;
   a spool slideably inserted into the casing, the spool valve having a first and a second non-waisted end portions and having a waisted middle portion;
   an intake port for fluids entering the casing;
   an output port for fluids exiting the casing;
   wherein a first non-waisted end portion covers the intake port during a first valve-closed event as the spool slides in one direction within the casing to a first position;
   wherein the waisted middle portion is sufficiently wide to uncover both the intake port and the output port during a valve-open event as the spool slides in the one direction within the casing to a second position;
   wherein a second non-waisted end portion covers the output port during a second valve-closed event as the spool slides in the one direction within the casing to a third position; and
   wherein the spool is operable to prevent the flow of the fluid into or out of the casing during the first valve-closed event and the second valve closed event.

2. The spool valve of claim 1, further comprising an actuator operable to both push and pull the spool within the casing, such that a valve-open event and the first and the second valve-closed events occur as the actuator pushes and pulls the spool.

3. The spool valve of claim 2, wherein the actuator is a cam actuator that pushes the spool against a coil spring.

4. The spool valve of claim 2, wherein the actuator is a cam actuator that pushes the spool against a gas spring.

5. The spool valve of claim 2, wherein the actuator is a crank actuator.

6. A spool valve for controlling the flow of a gas into a reciprocating piston cylinder, comprising:
   an outer casing;
   a spool slideably inserted into the casing, the spool valve having a first and a second non-waisted end portions and having a waisted middle portion;
   an intake port for fluids entering the casing;
   an output port for fluids exiting the casing;
   wherein a first non-waisted end portion covers the intake port during a first valve-closed event as the spool slides in one direction within the casing to a first position;
   wherein the waisted middle portion is sufficiently wide to uncover both the intake port and the output port during a valve-open event as the spool slides in the one direction within the casing to a second position;
   wherein a second non-waisted end portion covers the output port during s second valve-closed event as the spool slides in the one direction within the casing to a third position;
   wherein the spool is operable to prevent the flow of the fluid into or out of the casing during the first valve-closed event and the second valve closed event;
   a gas actuator operable to both push and pull the spool within the casing, such that a valve-open event and the first and the second valve-closed events occur as the actuator pushes and pulls the spool;
   wherein the gas actuator comprises a chamber within the casing at both ends of the spool and a poppet valve associated with each chamber operable to compress and expand the gas within the chamber.

7. The spool valve of claim 6, wherein the gas is an SCO2 gas.

8. The spool valve of claim 6, wherein the reciprocating piston cylinder is part of a gas expander.

* * * * *